United States Patent
Vreugdenhil et al.

(10) Patent No.: US 9,809,772 B2
(45) Date of Patent: Nov. 7, 2017

(54) POLYSILOXANE SCRUBBING LIQUID FOR REMOVING TAR-LIKE COMPOUNDS

(71) Applicant: Stichting Energieonderzoek Centrum Nederland, Petten (NL)

(72) Inventors: Berend Joost Vreugdenhil, Petten (NL); Alexander Bos, Petten (NL); Lucas Pancratius Johannes Bleijendaal, Petten (NL)

(73) Assignee: Stichting Energieonderzoek Centrum Nederland, Petten (NL)

( * ) Notice: Subject to any disclaimer, the term of this patent is extended or adjusted under 35 U.S.C. 154(b) by 347 days.

(21) Appl. No.: 14/420,554

(22) PCT Filed: Aug. 9, 2013

(86) PCT No.: PCT/NL2013/050590
§ 371 (c)(1),
(2) Date: Feb. 9, 2015

(87) PCT Pub. No.: WO2014/051419
PCT Pub. Date: Apr. 3, 2014

(65) Prior Publication Data
US 2015/0218472 A1    Aug. 6, 2015

(30) Foreign Application Priority Data
Aug. 10, 2012    (NL) .................................... 2009310

(51) Int. Cl.
*B01D 53/14*    (2006.01)
*C10K 1/16*    (2006.01)

(52) U.S. Cl.
CPC .............. *C10K 1/16* (2013.01); *B01D 53/145* (2013.01); *B01D 53/1406* (2013.01);
(Continued)

(58) Field of Classification Search
CPC ...... B01D 2252/205; B01D 2257/7027; B01D 53/1406; B01D 53/1425; B01D 53/145;
(Continued)

(56) References Cited

U.S. PATENT DOCUMENTS 5,772,734 A * 6/1998 Baker .................. B01D 1/0035
95/159

FOREIGN PATENT DOCUMENTS

EP        0 755 36 A1     3/1983
EP        2 189 416 A1    5/2010
(Continued)

OTHER PUBLICATIONS

International Preliminary Report on Patentability of PCT/NL2013/050590 dated Oct. 31, 2014.
(Continued)

*Primary Examiner* — Duane Smith
*Assistant Examiner* — Cabrena Holecek
(74) *Attorney, Agent, or Firm* — Gilberto M. Villacorta; Sunit Talapatra; Foley & Lardner LLP

(57) ABSTRACT

Tar-like components can be removed from gas streams resulting from gasification of coal, waste or biomass by contacting the gas with a liquid organic aryl polysiloxane. The polysiloxane preferably contains alkyl groups and aryl groups, and is in particular a polymethyl polyphenyl polysiloxane. The gas comprises one or more of hydrogen, carbon monoxide, carbon dioxide, and methane.

20 Claims, 1 Drawing Sheet

(52) U.S. Cl.
CPC ..... *B01D 53/1425* (2013.01); *B01D 53/1487* (2013.01); *B01D 53/1493* (2013.01); *B01D 2252/205* (2013.01); *B01D 2257/7027* (2013.01); *Y02C 20/20* (2013.01)

(58) Field of Classification Search
CPC .. B01D 53/1487; B01D 53/1493; C10K 1/16; Y02C 20/20
See application file for complete search history.

(56) References Cited

FOREIGN PATENT DOCUMENTS

| | | | |
|---|---|---|---|
| GB | 0 863 394 A | 3/1961 | |
| GB | 863394 A * | 3/1961 | ............... A24D 3/14 |
| GB | 2 305 136 A | 4/1997 | |
| WO | WO-03/018723 A1 | 3/2003 | |
| WO | WO-2010/085244 A1 | 7/2010 | |
| WO | WO-2011/037463 | 3/2011 | |

OTHER PUBLICATIONS

International Search Report of PCT/NL2013/050590 dated Nov. 12, 2013.

* cited by examiner

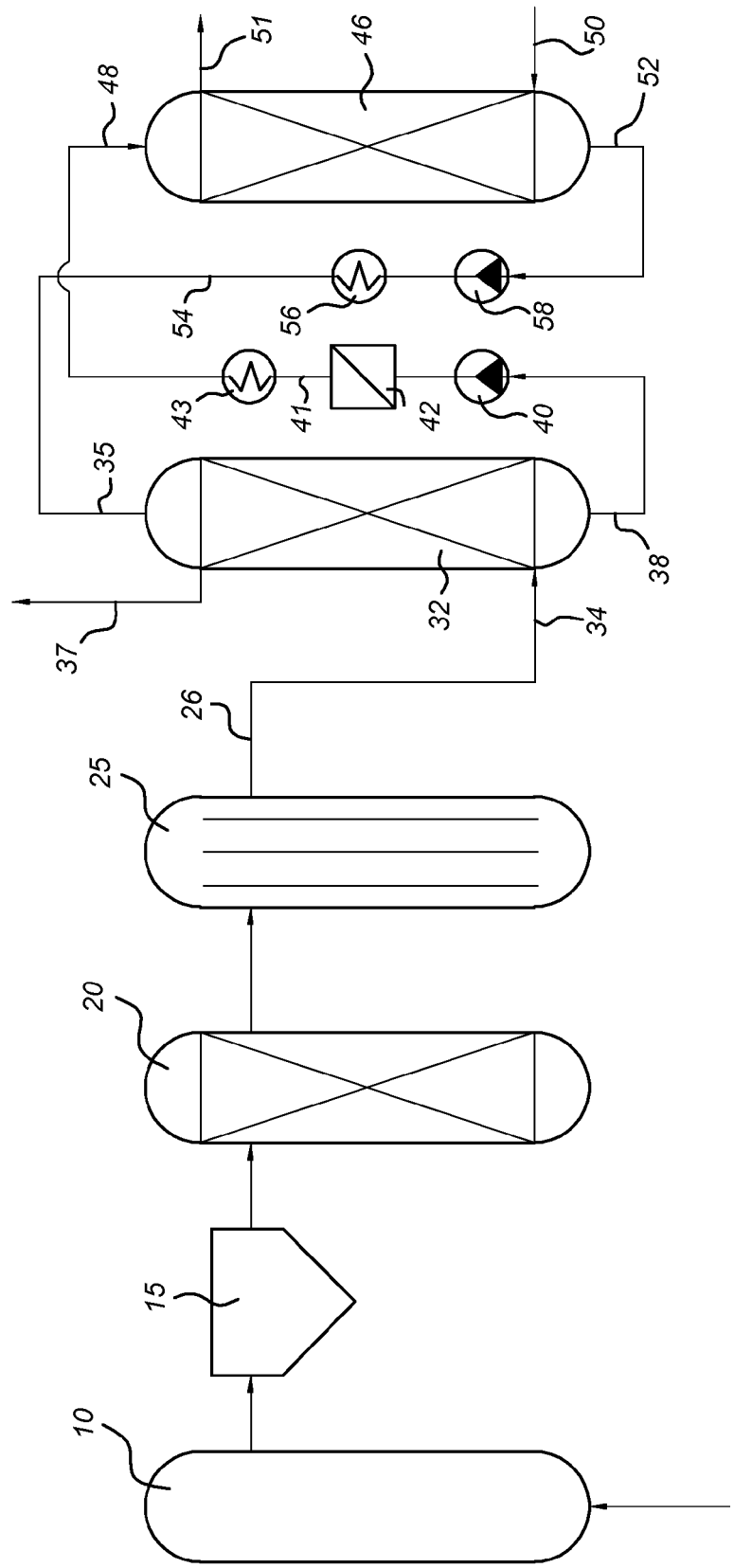

POLYSILOXANE SCRUBBING LIQUID FOR REMOVING TAR-LIKE COMPOUNDS

CROSS-REFERENCE TO RELATED APPLICATIONS

This application is the National Phase of International Patent Application No. PCT/NL2013/050590, filed Aug. 9, 2013, published as WO 2014/051419, which claims priority to Netherland Application No. 2009310, filed Aug. 10, 2012. The contents of which is herein incorporated by reference in its entirety.

The present invention relates to an advanced method for removing suspended organic material such as tar from gas flows. Such gas flows may originate i.a. from gasification of biomass, organic waste or coal.

BACKGROUND

A method for clarifying gas streams is known from WO 2008/010717. In this method, gas leaving a biomass reactor is subjected to a hydrocarbon oil flow. Excess oil is recirculated and is used after filtration for contact with the gas from the reactor. Additional oil is received from a downstream separation device into which the gas is entered.

WO 03/018723 discloses a so-called OLGA system for gasifying biomass. The gas which results from gasification is subjected to a two-step cleaning treatment for removing tars. In a first step the gas is condensed in a first cleaning fluid which is a hydrocarbon oil. Saturation can take place for example by spraying oil in the gas stream. In a second stage oil is used for absorption of the remaining tars in an absorption column. After use the oil with tars is discharged to a separator wherein the heavy fractions are returned to the biomass gasifier and the lighter fractions are further used as oil for the above process.

WO 2011/037463 discloses an oil recovery system (ORS) for a more effective tar removal from gasified biomass. It uses a first cleaning oil which is based on aromatic hydrocarbons and wherein the mixture of tar and first cleaning oil is separated into a light fraction and a heavy fraction, and the light fraction is reused as first cleaning oil. The second cleaning oil for removing residual tar components is based on aliphatic hydrocarbons.

The use of hydrocarbon oils for removing tars has some disadvantages, such as a limited stability at high temperatures and in the presence of water and oxidative agents, resulting in degradation and loss of oil due to the significant volatility of the hydrocarbons. As a result, the scrubbing liquid and equipment are contaminated and the process must be interrupted at regular intervals for exchange of scrubbing liquid and cleaning of equipment.

U.S. Pat. No. 5,772,734 discloses the use of a wide variety of organic scrubbing liquids, including low-viscosity silicone oils, light minerals oils and glycol ether especially triethylene glycol dibutyl ether for removing organic compounds such as chlorinated hydrocarbons or aromatic hydrocarbons (such as toluene) from industrial gas streams.

It was found that the problems associated with prior art processes can be effectively solved by using a scrubbing oil based on a polysiloxane.

DESCRIPTION OF THE INVENTION

The invention thus pertains to a process of clarifying a gas stream, comprising contacting the gas with a liquid organic polysiloxane. The contacting (scrubbing) results in absorption of tar-like compounds, in particular (poly)aromatic compounds of more than 6 carbon atom, especially 9-18 carbon atoms, into the polysiloxane scrubbing liquid. The gas stream to be clarified can be any gas comprising small molecules such as hydrogen, nitrogen, small hydrocarbons (up to 4 carbon atoms, such as methane and ethane), carbon monoxide and carbon dioxide. For example, the gas may comprise hydrogen, carbon monoxide, carbon dioxide, methane, nitrogen, and water (vapour), in addition to the tar components. The gas is in particular an energy gas or a synthesis gas containing one or more of hydrogen, carbon monoxide, and methane, in addition to varying levels of nitrogen, carbon dioxide and/or water, and sometimes ammonia and small hydrocarbons other than methane.

More in particular, the gas comprises at least 30 vol. %, especially more than 40% of one or more of hydrogen, methane and carbon monoxide. A typical composition of a gasification mixture comprises 10-40% CO, 5-30% $CO_2$, 2-40% $H_2$, 4-24% $CH_4$ and 5-40% $H_2O$ (based on volumes). Tar-like components may be present in widely varying concentration, e.g. from 1 ppm to 2% or higher, of which benzene may be the most abundant one (e.g. up to 1% (v/v) and up to 10% of the energy of the gasification mixture). In case of gasification using air, these levels are roughly divided by 2, the remaining 40-60% of the mixture being nitrogen.

Such a gas may originate from the gasification of biomass, organic waste, coal or a mixture of these. The organic waste may e.g. be municipal solid waste (MSW) and materials resulting in refuse-derived fuel (RDF). The biomass may be agricultural or forestry residues (wood chips, leafs, straw, grass, etc.) and the like.

The organic polysiloxane to be used as a washing (scrubbing) liquid comprises an alternating silicon-oxygen chain wherein the silicon is further substituted with organic groups. Preferably the polysiloxane is an aryl polysioxane, i.e. at least a part of the organic groups are aryl groups, including aralkyl or alkaryl groups. Preferably, the polysiloxane comprises an average of between 0.2 and 1.8 C5-C14 aryl group, more preferably 0.2-1.8 C5-C10 aryl group, per silicon atom. Advantageously, the polysiloxane also comprises alkyl groups, in particular 0.2-1.8 C1-C6 alkyl group per silicon atom, more in particular 0.2-1.8 C1-C4 alkyl groups per silicon atom.

In a preferred embodiment, the polysiloxane comprises an average of between 0.5 and 1.5 C5-C10, more preferably 0.5-1.5 C5-C14 aryl group, most preferably 0.5-1.5 C6-C8 aryl group per silicon atom and/or between 0.5 and 1.5 C1-C4 alkyl group per silicon atom. The polysiloxane preferentially has a molar weight between 500 and 14,000 Da, preferably between 700 and 7,000 Da, more preferably between 1,000 and 5,500.

The polysiloxane can be represented by one of the formulas (I) and (II);

$$—[—SiR^1R^2—O—]_n—  \quad (I)$$

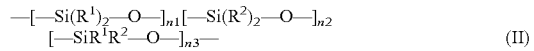

$$—[—Si(R^1)_2—O—]_{n1}[—Si(R^2)_2—O—]_{n2}[—SiR^1R^2—O—]_{n3}— \quad (II)$$

wherein:
$R^1$ and $R^2$ are the same or different, optionally substituted $C_1$-$C_{14}$ hydrocarbyl groups,
n is between 5 and 100, preferably between 7 and 40,
n1+n2+n3=n, (n1+n3)/n2 is between 1/9 and 9/1, preferably between 1/4 and 4/1, most preferably between 2/3 and 3/2, and/or (n2=n3)/n1 is between 1/9 and 9/1, preferably between 1/3 and 3/1, most preferably between 2/3 and 3/2.

Preferred polysiloxanes of formulas (I) and (II) are those wherein $R^1$ comprises at least 50% (by number) of aryl groups, preferably of 5-14 carbon atoms, more preferably of 5-10 carbon atoms, most preferably of 6-8 carbon atoms, the remainder being e.g. alkyl groups. Preferably at least 80%, more preferably at least 95% of the groups $R^1$ are such aryl groups. Aryl groups as used herein include alkylaryl and arylakyl (aralkyl) groups. Suitable aryl groups include phenyl, methylphenyl (p-tolyl), methoxyphenyl, benzyl, 2-phenyl-isopropyl, naphthyl and the like. Preferably $R^2$ comprises $C_1$-$C_4$ alkyl groups. Suitable alkyl groups include e.g. methyl and ethyl.

The polysiloxane can be a homopolymer, as represented by formula (I), or an alternating, block or random copolymer as depicted by formula (II), of dialkyl, alkyl-aryl and/or diaryl siloxanes. It can also be a mixture of different poly-dialkyl, poly-alkyl-aryl and/or polydiaryl siloxanes. Preferably, the polysiloxane is a poly-methyl-phenyl-siloxane or a polydiphenyl-co-dimethyl-siloxane or a polymethyl-phenyl-co-dimethyl-siloxane. Preferably the proportion of aryl groups is between 0.5 and 1.5 aryl (e.g. phenyl) groups per silicon atom. A most preferred polysiloxane is poly(methyl-phenylsiloxane). Depending on the tar components to be removed and the removal conditions, specific siloxanes, e.g. having specific molecular weight and/or specific organic groups can be prepared and used. Polysiloxanes can be prepared by methods known in the art. Various organic polysiloxanes including poly(methyl-phenylsiloxane) and poly-co-diphenyl-dimethyl-siloxane are commercially available.

In the process of the invention, the gas is contacted with the polysiloxane at elevated temperatures, such as a temperature between 30 and 150° C., preferably between 60 and 120° C., to absorb therein the aromatic tar-like components. Contrary to prior art processes using hydrocarbon-based scrubbing liquids, the temperature need not be above the water dew point, since water can be absorbed into the liquid without causing problems. The possibility of operating below the water dew point constitutes another advantage of the process of the invention.

The above contacting (scrubbing) temperatures will apply at atmospheric or slightly superatmospheric conditions. When using higher pressures, the temperatures will typically be higher so as to have comparable vapour pressures of the various components. As a rough rule of thumb, a doubling of the pressure corresponds to a higher temperature of about 20° C. Thus, an absorption step performed at 80° C. and 1 bar is roughly equivalent to a step performed at 100° C. and 2 bar, or at 145° C. at 10 bar, etc.

After being contacted with the gas, the polysiloxane, with the aromatic compounds absorbed therein, is heated to a temperature which is at least 50° C., preferably between 80 and 120° C. above the contacting temperature, and is stripped (desorbed) with a stripping gas, such as nitrogen, to remove the aromatic compounds. After stripping, the stripped polysiloxane is returned for a further contact cycle.

Again, these temperature differences apply at equal pressures. Instead of increasing the temperature, the pressure can be lowered, where, again, a temperature increase of 20° C. arbitrarily corresponds to a pressure decrease of a factor 2 and a temperature increase of at least 50° C. corresponds to a pressure decrease of a factor of at least 5.6. So, at equal temperatures, the stripping is preferably performed at a pressure which is a factor between 16 and 80 below the scrubbing pressure.

In absolute terms, the stripping can be performed for example at a temperature between 120 and 250° C., in particular between 150 and 220° C. at atmospheric pressure. Alternatively, the preferred stripping temperatures are e.g. between 90 and 220° C., preferably between 120 and 190° C. at ⅛(0.125) bar.

The gas stream is to be cleared from heavier compounds which hinder the subsequent use of the gas stream. Compounds to be removed are especially tar-like or tar-constituting compounds, in particular hydrocarbons having 6 or more carbon atoms. The compounds especially comprise aromatic hydrocarbons having 6 or more carbon atoms, such as benzene, alkylbenzenes, naphthalene and alkylnaphthalenes, and higher homologues, as well as the corresponding hydroxyl (phenolic) and amino compounds. The process of the invention is particularly useful for removing bicyclic, tricyclic and tetracyclic aromatic compounds having 9-18 carbon atoms, which are among the lighter tar components. These are largely carbocyclic, but heterocyclic compounds such as indoles, (iso)quinolines and chromenes may also be present. Also water and ammonia, as well as alcohols and amines (aliphatic or aromatic) and chlorine and sulphur components are conveniently removed by the process of the invention.

Examples of (poly)aromatic compounds which are effectively removed by the present process include indene, naphthalene, quinoline, isoquinoline, 2-methyl-naphthalene, 1-methyl-naphthalene, biphenyl, ethenyl-naphthalene, acenaphthylene, acenaphthene, fluorene, anthracene, phenanthrene, fluoranthene, pyrene, aceanthrylene, benzoanthracenes and chrysene. In addition to the $C_9$-$C_{18}$ aromatic components, slightly lighter, e.g. having 7 or 8 carbon atoms, as well as heavier tar-like compounds, e.g. up to 24 carbon atoms are effectively removed by the present process as well. Examples include the lighter components phenol, cresols, xylenes, ethylbenzene, styrene, cumene and the like, as well as the heavier benzofluoranthenes, benzopyrenes, perylene, picene, benzoperylenes, indenoperylenes, dibenzoanthracenes, benzoperylenes, coronene etc.

It is preferred that if the gas stream contains substantial levels of tar-like components having more than 18 carbon atoms, in particular if it contains components of more than 24 carbon atoms, a pre-cleaning steps is incorporated in the clarification process, as further described below.

In an embodiment of the invention, when the gas contains substantial levels of heavier tars, the gas to be clarified is pre-treated with another scrubbing liquid prior to being contacted to the polysiloxane. Such a prior scrubbing liquid preferably has a high affinity to more complex polycyclic (aromatic) hydrocarbons. Suitable prior scrubbing liquids are aromatic hydrocarbons, for example polyaromatic compounds corresponding to the tar-like compounds present in the gas and/or originate from scrubbing the tar-containing gas, comprising polyaromatics having 2-4 rings. Commercially available coal tars or coal tar naphthas (the lighter equivalent of coal tar) mainly consisting of $C_7$-$C_{18}$ hydrocarbons, are suitable as starting material for prior scrubbing. They will be suppleted during scrubbing with tars extracted from the gas. The prior scrubbing can be performed at a higher temperature than the scrubbing with the polysiloxane, for example a liquid inlet temperature of between 150 and 300° C., and a gas inlet temperature between 250° C. and 900° C.

Alternatively, or additionally, the gas issuing from the gasification may be cleared from dust particles before and/or after an optional prior scrubbing step by passing it e.g. through an electrostatic filter or an electrostatic precipitator as described in WO2008/010717. Other methods or devices for clearing dust and/or tar particles prior to the scrubbing step, can be used as well, such as an aerosol scavenger as described in WO 2011/099850.

In the prior scrubbing step using (poly)aromatic hydrocarbons as absorption liquid, the spent liquid resulting from the absorption step can be subjected to a separation step using evaporation of the lighter components. These lighter components can be reused as absorption (scrubbing) liquid for the prior scrubbing step. The heavier fraction resulting from the separation step is discharged. Part of this discharged heavy fraction can be returned to the inlet of the gasification or pyrolysis reactor and converted to lighter components, or it can be used for other purposes such as heating. Further details for a prior absorption (scrubbing) step using aromatic hydrocarbons are described in WO 2011/037463.

If desired, a further cleaning step can be introduced before or after the polysiloxane cleaning step, for example for further removing polar compounds such as ammonia or the like, using neutral, acidic or alkaline aqueous scrubbing liquids, or for removing water, e.g. by condensation. However, appreciable levels of water, ammonia, amines and the like are effectively captured by the polysiloxane liquid, so that additional cleaning steps will often not be necessary, unless the gas contains very high levels of such polar compounds. As these compounds such as water and ammonia are also readily desorbed from the polysiloxane scrubbing liquid, leaving the scrubbing liquid clean and stable, this constitutes a major advantage of the process of the invention.

The operation of the process and system of the invention can be described with reference to the accompanying figure. The system comprises an absorbing unit 32 such as a column, in which the gas to be clarified is fed in one part, preferably the bottom part, through gas inlet 34 and the scrubbing liquid comprising the polysiloxane is introduced through liquid inlet 35 in another part, preferably in the top part. Contact between the up-flowing gas and the down-flowing liquid can be enhanced by conventional means such as by spraying, using a packed column or a plate column. Although co-current scrubbing is feasible, a counter-current mode, using a packed column, is preferred. Clean gas can leave the absorbing unit at the top through 37, preferably after passing a mist-collecting unit so as to minimise loss of polysiloxane liquid. Spent scrubbing liquid in which the tar components are absorbed, is collected at the bottom and discharged through outlet 38. The absorbing unit can be operated at temperatures of e.g. between 30 and 150° C., at atmospheric or slightly superatmospheric pressures, or at higher temperatures, when higher pressures are applied.

Desorption of the spent scrubbing liquid is preferably performed in a stripping unit 46, where the tar-like components are desorbed from the polysiloxane scrubbing liquid by a stripping gas. The stripping unit can be a tray tower, packed column, bubble column, spray tower or the like. The stripping gas can be co-currently or, preferably, counter-currently contacted with the spent polysiloxane. The spent liquid is fed to the stripping unit through line 41, optionally containing a pump 40, a safety filter 42 and a heater 43, and introduced through inlet 48. The stripping gas is introduced at inlet 50 and the spent stripping gas is discharged through outlet 51. The stripping gas can e.g. be air, nitrogen, carbon dioxide or mixtures thereof. The stripping unit is operated at about 100° C. above the temperature of the absorption column, more generally between 70 and 120° C. above the temperature of the absorption column, when using the same pressures. At atmospheric pressures, the temperatures can be between 120 and 250° C. Instead of using higher temperatures, the stripping unit 46 can be operated at lower pressure than the absorption unit 32. The desorbed polysiloxane exits the stripper through 52 and is returned to the absorption column through line 54, optionally using through a pump 58 and a cooler 56. Heater 43 and cooler 56 can advantageously be in heat exchanging communication. Instead or in addition to the heater 43 and cooler 56, pressurising and depressurising devices can be inserted. The gas issuing from the stripping unit through 51 can be cooled for condensing and separating the tar components. If desired, these separated tar components can be used to adjust the content of aromatic hydrocarbons and/or the viscosity of upstream scrubbing liquids.

The system of the invention for producing and cleaning an energy gas or synthesis gas can comprise a coal, waste or biomass gasifier of pyrolyser 10 to which a flow of biomass is added through an inlet. The gasifying gas can be e.g. air, oxygen and/or steam. The biomass, coal and/or waste can be further supplied with tar-like components issuing for one of the downstream clarifying process steps. Gasification can be performed at a temperature of 600-1300° C. using sub-stoichiometric quantities of oxygen. Pyrolysis can be performed at the same or somewhat lower temperature (e.g. from 450° C. up to 950° C.).

Gas issuing from the gasifier can be subjected to a first separation step 15 based on gravitation and more particularly with a cyclone for removing dust. Next, the partly cleaned gas flow can be treated in the prior scrubbing step 20. Part or most of the tars contained in the gas flow are caught in this way. Besides tars based on hydrocarbons and dust, also sulphur and chloride-containing material can be removed from the gas flow. In an optional next step, the partly cleaned gas can be passed through a filter 25, for example an electrostatic precipitator, which removes dust. Instead of scrubber 20 and/or filter 25, an alternative tar and dust removing step can be inserted, such as an aerosol scavenger. Then, the gas can be entered in the process of the invention through line 26 for removing residual tar using the polysiloxane scrubbing and enters the scrubber through inlet 34. The preceding units 10, 15, 20 and 25 are only schematically depicted in the accompanying figure. More details are given in WO 2008/010717 and WO 2011/037463. Depending on the quality of the input gas, one or more or all of the intermittent cleaning steps described above can be dispensed with.

DESCRIPTION OF THE FIGURE

The accompanying FIGURE shows a gas cleaning system according to the invention.

EXAMPLE

A substitute natural gas (SNG) containing 13 vol % methane, 2 vol % nitrogen, 32 vol % carbon monoxide, 18 vol % carbon dioxide, 28% vol % hydrogen and 4 vol % ethene and containing about 11-12 g/Nm$^3$ of C8-C16 (poly) aromatic hydrocarbons, was subjected to absorption using either a conventional aliphatic hydrocarbon derived from mineral oil or a commercial polymethylphenylsiloxane (PMPS) as an absorption liquid, and the absorption liquid was subsequently stripped using air.

The setting of the absorber and stripper were as follows in both cases:
Temperature absorber=80° C.
Temperature stripper=180° C.
Gas flow stripper=16 l/min (~1 Nm$^3$/h)
Oil flow absorber/stripper32 2.1 l/min The tests were performed 4 times and the results were averaged. Table 1 below shows the concentrations (in mg/Nm$^3$) and removal rates for the hydrocarbons up to pyrene. Benzene and toluene were omitted as they could not be precisely measured. Tar components of a level below 50 mg/Nm$^3$ (in both columns) were also omitted.

Continued operation using the aliphatic hydrocarbon oil resulted in a significant loss of about 6 g oil per m$^3$ of scrubbed gas, whereas the loss of the polysiloxane was negligible (<0.5 g/m$^3$). The hydrocarbon oil turns brown and eventually black and starts smelling after a few scrubbing cycles, whereas the polysiloxane oil remains clear and essentially colourless after prolonged operation.

TABLE 1

Removal rate of tar components by aliphatic oil vs. polysiloxane oil

|  | Mineral Oil | | | PMPS | | |
| --- | --- | --- | --- | --- | --- | --- |
|  | Abs in | Abs out | Removal | Abs in | Abs out | Removal |
| Ethylbenzene | 14 | 2 | 87% | 66 | 7 | 90% |
| m/p-Xylene | 59 | 10 | 84% | 110 | 23 | 79% |
| o-Xylene + Styrene | 791 | 83 | 89% | 1169 | 163 | 86% |
| Phenol | 510 | 34 | 93% | 404 | 7 | 98% |
| Indene | 2478 | 17 | 99% | 1219 | 6 | 99% |
| m/p-Cresol | 40 | 3 | 94% | 62 | 17 | 73% |
| Naphthalene | 5978 | 103 | 98% | 4746 | 20 | 100% |
| 2-Methylnaphthalene | 225 | 7 | 97% | 346 | 1 | 100% |
| 1-Methylnaphthalene | 132 | 4 | 97% | 191 | 0 | 100% |
| Biphenyl | 99 | 1 | 99% | 160 | 0 | 100% |
| Acenaphthene | 307 | 11 | 96% | 492 | 6 | 99% |
| Fluorene | 133 | 10 | 93% | 286 | 1 | 100% |
| Phenanthrene | 202 | 19 | 90% | 536 | 2 | 100% |
| Anthracene | 26 | 2 | 94% | 71 | 0 | 100% |
| Fluoranthene | 56 | 9 | 85% | 149 | 1 | 99% |
| Pyrene | 33 | 2 | 94% | 100 | 1 | 99% |

The invention claimed is:

1. A process of clarifying a gas stream comprising tar-like or tar-constituting components comprising aromatic compounds having 6 or more carbon atoms, the process comprising contacting the gas stream with a liquid organic aryl polysiloxane as a washing liquid.

2. The process according to claim 1, wherein the polysiloxane comprises an average of between 0.2 and 1.8 C5-C14 aryl group per silicon atom.

3. The process according to claim 1, wherein the polysiloxane comprises an average of between 0.5 and 1.5 C5-C10 aryl group and between 0.5 and 1.5 C1-C4 alkyl group per silicon atom.

4. The process according to claim 1, wherein the polysiloxane has a molar weight between 700 and 7000 Da.

5. The process according to claim 1, wherein the polysiloxane is a polymethylphenyl-siloxane or a poly-diphenyl-dimethyl-siloxane.

6. The process according to claim 1, wherein the tar-like components comprise polycyclic aromatic compounds having 9-18 carbon atoms.

7. The process according to claim 1, wherein the gas stream, prior to contacting with the polysiloxane, is treated with a scrubbing liquid comprising aromatic hydrocarbons, at a temperature of between 150 and 900° C.

8. The process according to claim 1, wherein the gas stream, prior to contacting with the polysiloxane, is subjected to an electrostatic filter.

9. The process according to claim 1, wherein the gas stream originates from the gasification of biomass, organic waste, coal or a combination thereof.

10. The process according to claim 1, wherein the gas stream, prior to contacting with the polysiloxane, is subjected to an aerosol scavenger.

11. The process according to claim 1, wherein the gas stream comprises one or more of hydrogen, carbon monoxide, carbon dioxide, methane and nitrogen.

12. The process according to claim 11, wherein the gas stream comprises at least 30 vol. % of one or more of hydrogen, methane and carbon monoxide.

13. The process according to claim 1, wherein the gas stream is contacted with the polysiloxane at a temperature between 30 and 150° C. at atmospheric pressure.

14. The process according to claim 13, wherein the gas stream is contacted with the polysiloxane at a temperature between 60 and 120° C., at atmospheric pressure.

15. The process according to claim 13, further comprising heating the polysiloxane to a temperature which is higher than the temperature used in the contacting step.

16. The process according to claim 15, wherein, at constant pressure, the higher temperature is at least 50° C. above the temperature used in the contacting step.

17. The process according to claim 16, wherein, at constant pressure, the higher temperature is between 80 and 120° C. above the temperature used in the contacting step.

18. The process according to claim 13, further comprising depressurising the polysiloxane to a pressure which is lower than the pressure used in the contacting step.

19. The process according to claim 18, wherein, at constant temperature, the lower pressure is at least 5.6 times lower than the pressure use in the contacting step.

20. The process according to claim 19, wherein, at constant temperature, the lower pressure is between 8 and 16 times lower than the pressure used in the contacting step.

* * * * *